(12) United States Patent
Germanetti

(10) Patent No.: US 10,545,047 B2
(45) Date of Patent: Jan. 28, 2020

(54) METHOD OF ESTIMATING THE INSTANTANEOUS MASS OF A ROTARY WING AIRCRAFT

(71) Applicant: AIRBUS HELICOPTERS, Marignane (FR)

(72) Inventor: Serge Germanetti, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 1115 days.

(21) Appl. No.: 15/161,620

(22) Filed: May 23, 2016

(65) Prior Publication Data
US 2017/0010148 A1    Jan. 12, 2017

(30) Foreign Application Priority Data

May 29, 2015  (FR) ...................................... 15 01117

(51) Int. Cl.
*G01G 19/07*  (2006.01)
*G07C 5/08*  (2006.01)

(52) U.S. Cl.
CPC ........... *G01G 19/07* (2013.01); *G07C 5/0816* (2013.01)

(58) Field of Classification Search
CPC ....... B64C 27/001; B64C 27/04; B64C 27/82; G01G 19/07; G01G 19/414; G01C 23/005;

(Continued)

(56) References Cited

U.S. PATENT DOCUMENTS 5,987,397 A    11/1999  McCool et al.
7,471,995 B1*  12/2008  Robinson ............... G01C 23/00
                                                      340/901

(Continued)

FOREIGN PATENT DOCUMENTS

EP    0502811 A2    9/1992
EP    0502811 A3    9/1992

(Continued)

OTHER PUBLICATIONS

French Search Report for French Application No. FR 1501117, Completed by the French Patent Office on Mar. 2, 2016, 6 Pages.

*Primary Examiner* — Regis J Betsch
*Assistant Examiner* — Kaleria Knox
(74) *Attorney, Agent, or Firm* — Brooks Kushman P.C.

(57) ABSTRACT

A method and a device for estimating the instantaneous mass of a rotary wing aircraft, the aircraft having a power plant driving at least one main rotor and an anti-torque rotor in rotation, and also having a plurality of sensors. The method uses functional characteristics and flight characteristics of the aircraft, atmospheric characteristics, and performance curves for the aircraft to determine the measured instantaneous mass $M_m$ of the aircraft. Furthermore, the method makes it possible to consolidate the measured instantaneous mass $M_m$ of the aircraft by comparing it in arithmetical or statistical manner during a flight of the aircraft with a calculated instantaneous mass $M_c$ determined from the variation in the quantity of fuel present in the aircraft.

19 Claims, 4 Drawing Sheets

(58) Field of Classification Search
CPC ....... G01C 23/00; G05B 23/024; G06F 17/00; G01V 7/16
USPC .......... 244/53 R, 1 N; 701/7, 31.4; 340/670; 434/33
See application file for complete search history.

(56) References Cited

U.S. PATENT DOCUMENTS

| | | | | |
|---|---|---|---|---|
| 7,496,433 | B1* | 2/2009 | Marze | B64C 27/001 244/1 N |
| 8,757,542 | B2* | 6/2014 | Hopdjanian | B60L 3/0046 244/53 R |
| 2002/0092350 | A1* | 7/2002 | Etkin | G01V 7/16 73/382 G |
| 2007/0273544 | A1* | 11/2007 | Astruc | G01C 23/005 340/670 |
| 2009/0186320 | A1* | 7/2009 | Rucci | B64C 27/04 434/33 |
| 2013/0211703 | A1* | 8/2013 | Evrard | G06F 17/00 701/123 |
| 2013/0274989 | A1* | 10/2013 | Isom | B64D 45/00 701/31.4 |
| 2014/0236534 | A1* | 8/2014 | Ling | G05B 23/024 702/182 |
| 2015/0094982 | A1* | 4/2015 | Dupont De Dinechin | G01G 19/414 702/175 |
| 2015/0100184 | A1* | 4/2015 | Nathan | G01C 23/00 701/7 |
| 2015/0225078 | A1* | 8/2015 | Ries | B64C 27/82 416/3 |

FOREIGN PATENT DOCUMENTS

| | | | | |
|---|---|---|---|---|
| EP | 2461142 | | 6/2012 | |
| EP | 2461142 | * | 12/2015 | ............ G01G 19/08 |
| GB | 2137153 | | 10/1984 | |

* cited by examiner

METHOD OF ESTIMATING THE INSTANTANEOUS MASS OF A ROTARY WING AIRCRAFT

CROSS REFERENCE TO RELATED APPLICATION

This application claims priority to French patent application No. FR 15 01117 filed on May 29, 2015, the disclosure of which is incorporated in its entirety by reference herein.

BACKGROUND OF THE INVENTION (1) Field of the Invention

The present invention relates to the field of assisting the piloting of rotary wing aircraft.

The present invention relates to a method and to a device for estimating the instantaneous mass of a rotary wing aircraft.

(2) Description of Related Art

A rotary wing aircraft conventionally comprises a power plant having at least one engine, generally a turboshaft engine, and a main power transmission gearbox, the power plant acting via the main gearbox to drive at least one main rotor for providing the aircraft with lift and possibly also with propulsion, and possibly also to drive an anti-torque rotor. By way of example, an anti-torque rotor may be provided by a tail rotor of the aircraft or indeed by two propulsive propellers situated on either side of a fuselage of the aircraft.

In operation of the aircraft, various characteristic parameters are generally monitored by means of several instruments situated on an instrument panel of the aircraft. These characteristic parameters are representative of the current operation of the aircraft and in particular of its power plant and/or of each turboshaft engine.

By way of example, these characteristic parameters may be the speed of rotation Ng of the gas generator of each engine, the gas ejection temperature T4 at the inlet to the free turbine of each engine, and the driving torque $C_m$ from each engine.

For physical reasons, there exist limits on these characteristic parameters, which limits need to be taken into account at all times while the aircraft is in operation. These various limits may depend on external conditions and also on the mode of operation of the aircraft.

While the aircraft is in operation, its pilot needs to monitor the current values of these characteristic parameters continuously and to compare them with their respective limits.

These limits generally differ depending on the stage of flight of the aircraft and/or on external conditions, such as altitude and temperature, for example. Specifically, the maximum power that can be delivered by the power plant differs and the length of time for which it is available may also be limited depending on each stage of flight and/or depending on external conditions and indeed on the mode of operation of the power plant.

Furthermore, the instantaneous mass of the aircraft is a parameter that is important for determining certain limits and/or certain current values of these characteristic parameters, such as the power that each engine of the power plant needs to deliver in order to perform the flight or indeed to perform some particular maneuver. In particular, the power plant needs to be capable of supplying sufficient mechanical power to ensure that the lift from the main rotor supports at least the instantaneous mass of the aircraft, thus providing the aircraft with lift.

At present there exist several methods of estimating the mass of the aircraft.

The mass of the aircraft is generally estimated before the aircraft takes off and flies, e.g. by summing the empty mass of the aircraft plus the on-board mass of fuel, plus the mass of the crew, and the mass of the transported payload. This estimate of the mass of the aircraft prior to takeoff is then used during the flight of the aircraft. This estimate of the mass of the aircraft then takes no account of fuel being consumed by the aircraft. This estimate of the mass of the aircraft is thus constant and remains unchanged throughout the flight of the aircraft, so its difference relative to the real instantaneous mass of the aircraft increases as a flight continues. Consequently, this estimate of the mass of the aircraft is an overestimate, and it therefore leads to the performance of the aircraft not being optimized.

It is also possible for the mass of the aircraft to be estimated while the aircraft is in flight, generally by subtracting the quantity of fuel that has been consumed from the estimate of the mass of the aircraft prior to takeoff.

Nevertheless, this estimate of the mass of the aircraft is generally not very accurate, and it leads to information about the performance of the aircraft that is not optimized. It is general practice to use a safety margin when determining this estimate of the mass of the aircraft, and as a result the estimated mass of the aircraft is an overestimate. By way of example, this safety margin may take account of approximations in determining the mass of the aircraft.

This overestimate of the mass errs on the safe side, so the mechanical power that the aircraft genuinely needs for flight is less than the necessary power as determined on the basis of this estimate of the mass of the aircraft. However, for certain maneuvers that require a large amount of mechanical power, this overestimated power requirement may be greater than the maximum power available from the power plant, whereas the mechanical power that is genuinely required is less than the maximum power available for each engine. Consequently, such maneuvers are not performed by the pilot who believes, wrongly, that the power plant cannot deliver sufficient total power. This estimate of the mass can thus lead to the flight envelope of the aircraft being reduced to a greater or lesser extent.

Nevertheless, it is also possible for this estimate of the mass of the aircraft to be an underestimate, particularly as a result of wrongly identifying the on-board mass not including fuel, e.g. as constituted by the passengers of the aircraft and their baggage. Such an underestimate of the mass of the aircraft leads to a safety risk during flights of the aircraft, unlike an overestimate, and accidents have occurred as a result of errors of this type.

The mass of an aircraft can also be determined by making use of measurements of the environment and/or of components of the aircraft.

By way of example, Document EP 2 461 142 describes a device for determining the takeoff mass of an aircraft, in particular by using atmospheric parameters relating to the environment of the aircraft, flight parameters of the aircraft and relating to its engines, and also performance curves for its engines. That method is adapted to the aircraft performing stabilized and horizontal flight, i.e. level forward flight at constant speed, or hovering flight.

Likewise, Document EP 0 502 811 describes a device for determining the mass of an aircraft that makes use of the distance between its fuselage and the blades of its main rotor together with the speed of rotation of the blades.

Also known is Document U.S. Pat. No. 5,987,397, which describes a device for estimating the mass and the center of gravity of an aircraft as a function of measurements of flight parameters and by using a neural network system. The neural network applies a relationship between the mass of the aircraft and its flight parameters using an algorithm that is non-linear, which relationship is established beforehand on the basis of test flights.

Furthermore, Document GB 2 137 153 describes a device for determining the mass of an aircraft when its landing gear is in contact with the ground and as a function of the upward thrust developed by the main rotor of the aircraft.

BRIEF SUMMARY OF THE INVENTION

The present invention thus seeks to provide a method and a device making it possible to overcome the above-mentioned limitations, and making it possible in particular to make an accurate and reliable estimate of the instantaneous mass of a rotary wing aircraft in flight.

According to the invention, a method of estimating the instantaneous mass of a rotary wing aircraft comprises a plurality of steps performed during a flight:

measuring flight characteristics of the aircraft, such as a horizontal speed Vh and a vertical speed Vz of the aircraft relative to air and also a height Hz of the aircraft relative to the ground;

measuring power characteristics of the aircraft, such as the torque $C_R$ and the real speed of rotation NR of the main rotor and also the torque $C_{RAC}$ and the real speed of rotation $NR_{AC}$ of the anti-torque rotor;

measuring atmospheric characteristics relating to the environment of the aircraft, such as the atmospheric pressure $P_0$ and the temperature $T_0$ of the air around the aircraft;

determining the flight power W of the aircraft;

determining an operating point of the aircraft on at least one series of performance curves for the aircraft as a function of the flight characteristics of the aircraft, of the atmospheric characteristics, and of the flight power W of the aircraft; and deducing therefrom the measured instantaneous mass $M_m$ of the aircraft.

A rotary wing aircraft has various sensors providing measurements of various kinds of information about the environment of the aircraft and/or the state and the operation of the aircraft and its equipment, and/or about the position and the movements of the aircraft relative to its environment.

For example, a first type of sensor serves to measure first information about the flight of the aircraft such as the air speed of the aircraft. By way of example, the measured air speed of the aircraft may be resolved into a horizontal speed Vh and a vertical speed Vz, where the horizontal and vertical directions are defined in a terrestrial reference frame.

Furthermore, and in order to simplify the description, the term "speed" is used to designate the speed of the aircraft relative to air. Specifically, the flight of the aircraft is characterized by aerodynamic effects associated with the air speed of the aircraft, thereby taking account of the effects of wind, with the wind increasing or decreasing the lift of the aircraft and thus conversely reducing or increasing its need for power depending on whether the wind is a head wind or a tail wind relative to the aircraft.

A second type of sensor serves to measure a second kind of information relating to the position of the aircraft. A sensor of this second type may for example be a radioaltimeter determining the height Hz of the aircraft relative to the ground.

These first and second kinds of information relating to the speed of the aircraft and to its height Hz are flight characteristics of the aircraft.

A third type of sensor serves to measure a third kind of information relating to the environment of the aircraft such as the atmospheric pressure and the temperature outside the aircraft. This third kind of information constitutes atmospheric characteristics relating to the environment of the aircraft, which characteristics have an influence on the aerodynamic behavior of the main rotor and also on the operation of each engine of the aircraft.

Finally, sensors of a fourth type serve to measure a fourth kind of information relating to the performance of the aircraft, relating in particular to the main rotor, to the anti-torque rotor, and to the power plant of the aircraft. By way of example, this fourth kind of information comprises the torque $C_R$ and the real speed of rotation NR of the main rotor or indeed the torque $C_{RAG}$ and the real speed of rotation $NR_{AC}$ of the anti-torque rotor. This fourth kind of information could equally well be the torque and the speed of rotation of a main outlet shaft of the power plant or indeed of each engine. This fourth kind of information constitutes measurements suitable for reconstituting the power characteristics of the aircraft.

The power characteristics serve in particular to determine the power being consumed respectively by the main rotor and by the anti-torque rotor, or indeed the power being delivered by the power plant or by each engine. It is then possible to deduce the power W used specifically for enabling the aircraft to fly, which power is referred to more simply in the description below as the "flight power".

This flight power W of the aircraft may be determined by performing various calculations.

Firstly, the flight power W is shared between the main rotor and the anti-torque rotor so as to provide the aircraft with lift and enable it to move. This flight power W is thus equal to the sum of the powers consumed by the main rotor and by the anti-torque rotor.

The instantaneous power consumed by the main rotor may be defined in conventional manner using the formula $W_{RP}=C_R \cdot NR$.

The instantaneous power consumed by the anti-torque rotor may be determined using an analogous formula $W_{RAC}=C_{RAC} \cdot NR_{AC}$.

This instantaneous power consumed by the anti-torque rotor is used essentially for opposing torque due to the reaction of the main rotor of the aircraft to the driving torque used to rotate the main rotor, and it can thus be estimated in known manner. For example, this instantaneous power consumed by the anti-torque rotor may be determined depending on the speed of advance of the aircraft. When this speed of advance is zero, the anti-torque rotor is alone in opposing this torque, whereas when the speed of advance is non-zero, a transverse aerodynamic force that is proportional to the square of the speed of advance is generally generated by a substantially vertical tail fin situated in the proximity of the tail rotor, thereby enabling the instantaneous power that is consumed by the anti-torque rotor to be reduced.

Furthermore, the total power delivered by the power plant of the aircraft is shared firstly as a flight power W to enable the aircraft specifically to fly, and secondly as an accessory power $W_{acc}$ for powering the various pieces of equipment of the aircraft. Consequently, the flight power W is equal to the total drive power delivered by the power plant minus the accessory power $W_{acc}$.

By way of example, this accessory power is used to power the electrical equipment of the aircraft such as its avionics, hydraulic and electrical equipment, or indeed cabin air conditioning. This accessory power $W_{acc}$ is thus made up mainly of electrical power and of hydraulic power and it can be determined in known manner.

The total power delivered by the power plant may be determined from the torque $C_{im}$ and the speed of rotation $N_{im}$ of a main outlet shaft of the power plant, such that $W_{im}=C_{im} \cdot NR_{im}$.

This total power delivered by the power plant may also be determined as the sum of the powers delivered by its engines. Furthermore, when each engine of the power plant is a turboshaft engine comprising a gas generator and a free turbine, the power delivered by each engine is a function of the torque at the outlet from the engine, of an internal temperature T4 of the gas at the inlet to the free turbine of the engine, and of the speed of rotation Ng of the gas generator of the engine. The instantaneous power $Wm_{inst}$ delivered by each engine can thus be estimated as $Wm_{inst}=C_m \cdot Ng$, where $C_m$ is the drive torque relating to the gas generator.

Thereafter, as a function of the flight characteristics of the aircraft, of the atmospheric characteristics, and of the flight power W, it is possible to determine an operating point of the aircraft using one or more performance curves for the aircraft.

The performance curves for an aircraft are supplied with the flight manual of the aircraft. They are specific to each aircraft and they are correlated with power curves for the engines of the vehicle, taking account of how each engine is installed in the aircraft.

The performance curves serve to characterize each aircraft and in particular the flight power W that the aircraft needs to supply, or indeed can supply, as a function not only of atmospheric criteria such as the atmospheric pressure $P_0$ and the temperature $T_0$ of the air around the aircraft, but also as a function of parameters concerning the aircraft, such as its mass or its speed.

Various different series of performance curves exist for each aircraft depending on different stages of flight of the aircraft, and mainly for hovering flight, for level flight, and for altitude-changing flight.

In order to define which series of performance curves should be used by the method of the invention, it is possible to use a selection algorithm. By way of example, the selection algorithm uses values for the horizontal speed Vh and the vertical speed Vz of the aircraft in order to determine whether the aircraft is in hovering flight, in altitude-changing flight, or indeed in level flight, for example.

Specifically, during hovering flight, the horizontal speed Vh and the vertical speed Vz of the aircraft are substantially zero.

During altitude-changing flight, the vertical speed Vz and the horizontal speed Vh of the aircraft are not zero. The term "altitude-changing" flight is used to cover both climbing flight and descending flight of the aircraft at a non-zero speed of advance. Pure vertical flight, i.e. at a zero speed of advance, constitutes a particular kind of flight that satisfies specific criteria.

During level flight, the vertical speed Vz of the aircraft is substantially zero and its horizontal speed Vh is non-zero.

Advantageously, these three stages of flight, namely hovering flight, altitude-changing flight, and level flight, cover about 90% of flight situations for an aircraft. The other flight situations are generally particular and transient stages such as pure vertical flight, stages of flight at high acceleration, and turns at a large rate of turn, e.g. greater than ten degrees per second (10°/s).

Finally, on the basis of these performance curves for the aircraft, of the flight characteristics, of the atmospheric characteristics, and of the flight power, the measured instantaneous mass $M_m$ of the aircraft is deduced in a manner that is accurate and reliable.

As a result, the measured instantaneous mass $M_m$ can be determined accurately and reliably mainly during these three particular stages of flight of the aircraft. Advantageously, the measured instantaneous mass $M_m$ can be determined accurately and reliably during the majority of the time the aircraft is in flight. Specifically, this measured instantaneous mass $M_m$ cannot be determined accurately and reliably during the other stages of flight that are transient and thus of short duration. Thus, the absence of this accurate and reliable measured instantaneous mass $M_m$ is of short duration and does not disturb the flying of the aircraft.

Advantageously, knowledge of the measured instantaneous mass $M_m$ then makes it possible to optimize use of the aircraft by making use of this measured instantaneous mass $M_m$ instead of an estimate of the mass of the aircraft.

For example, this measured instantaneous mass $M_m$ of the aircraft makes it possible to determine more accurately the flight power needed for performing a particular maneuver of the aircraft, such as a slow descent in order to land, or flying level while optimizing fuel consumption, i.e. seeking to maximize flight duration or to maximize range.

Furthermore, on the basis of a maximum total power available from the power plant and of this measured instantaneous mass $M_m$, it is possible to determine accurately the maximum mass that can be transported by the aircraft. Specifically, by using the performance curves for the aircraft and by knowing the maximum power available from the power plant, it is possible to determine the maximum total mass that is possible for the aircraft in flight. It is then possible to deduce the transportable maximum mass, as the difference between said maximum total mass and the measured instantaneous mass $M_m$ of the aircraft.

Finally, the measured instantaneous mass $M_m$ of the aircraft and this transportable maximum mass can be displayed on an instrument or indeed a screen present on the instrument panel of the aircraft so that the pilot of the aircraft is informed.

When the aircraft is in hovering flight, the functional characteristics of the aircraft are defined in particular by a series of first performance curves complying with a first formula:

$$\frac{W}{\sigma} \cdot \left(\frac{NR_0}{NR}\right)^3 = k \cdot f_1\left[\frac{M_m}{\sigma} \cdot \left(\frac{NR_0}{NR}\right)^2\right]$$

Under such conditions, W is the flight power of the aircraft, $\sigma$ is a conversion coefficient, k is a ground influence coefficient, $M_m$ is the measured instantaneous mass of the aircraft, $NR_0$ is a setpoint speed of rotation for the main rotor, NR is the real speed of rotation of the main rotor, and $f_1$ is a first function represented by a series of first performance curves for the aircraft having a first value:

$$A_1 = \frac{W}{\sigma} \cdot \left(\frac{NR_0}{NR}\right)^3$$

as the ordinate value and having a second value:

$$A_2 = \frac{M}{\sigma} \cdot \left(\frac{NR_0}{NR}\right)^2$$

as the abscissa value.

The value of this ground influence coefficient k is defined by a curve as a function of the height Hz of the aircraft relative to the ground. This ground influence coefficient k serves to quantify the effect of the proximity of the ground on the behavior of the aircraft and on the flight power of the aircraft as a function of the height Hz of the aircraft relative to the ground.

When the aircraft is close to the ground, the ground returns the wash from the main rotor against the fuselage and against the main blades of the main rotor, thereby modifying the behavior of the aircraft. It is then said that the aircraft is in ground effect (IGE). This IGE zone covers a height going from the ground up to about four times the diameter of the main rotor of the aircraft.

Above this IGE zone, i.e. at a height above the ground that is greater than about four times the diameter of the rotor of the aircraft, the aircraft is no longer subjected to ground effect. It is then said that the aircraft is out of ground effect (OGE).

The influence coefficient k is equal to unity when the aircraft is in an OGE zone. This influence coefficient k varies with the height Hz of the aircraft relative to the ground from a minimum value to a maximum value when the aircraft is in an IGE zone. The maximum value is generally equal to 1.1 for all aircraft, whereas the minimum value, which corresponds to the aircraft at ground level, varies depending on the aircraft and may lie in the range 0.6 to 0.9. The influence coefficient k may for example lie in the range 0.6 to 1.1 for a given aircraft.

Thus, in order to determine the measured instantaneous mass $M_m$ of the aircraft during hovering flight, the following steps are performed:

calculating the conversion coefficient $\sigma$ such that:

$$\sigma = \left(\frac{P_0}{T_0}\right);$$

where $P_0$ and $T_0$ are respectively the atmospheric pressure and the temperature around the aircraft, the atmospheric pressure $P_0$ being expressed in millibars (mb) and the temperature $T_0$ being expressed in kelvins (K);

calculating a first value $A_1$ such that:

$$A_1 = \frac{W}{\sigma} \cdot \left(\frac{NR_0}{NR}\right)^3$$

as a function of the first value $A_1$ and using a first performance curve of the aircraft applying the first function $f_1$ corresponding to the flight conditions of the aircraft determining a second value $A_2$ such that:

$$A_2 = f_1\left[\frac{M_m}{\sigma} \cdot \left(\frac{NR_0}{NR}\right)^2\right] = \frac{\frac{M_m}{\sigma} \cdot \left(\frac{NR_0}{NR}\right)^2}{k}$$

determining the influence coefficient k depending on the height Hz of the aircraft relative to the ground; and using the second value $A_2$ to calculate the measured instantaneous mass $M_m$ of the aircraft, such that:

$$M_m = k \cdot A_2 \cdot \sigma \cdot \left(\frac{NR}{NR_0}\right)^2$$

When the aircraft is in altitude-changing flight, the functional characteristics of the aircraft are defined in particular by second and third series of performance curves in application respectively of a second formula:

$$\left(\frac{W}{\sigma}\right) / \left(\frac{W'}{\sigma}\right)_{V_y} = f_2(V_z)$$

and of a third formula:

$$\left(\frac{W'}{\sigma}\right)_{V_y} = f_3\left(\frac{M_m}{\sigma}\right)$$

Under such conditions, W is the flight power of the aircraft, $\sigma$ is the conversion coefficient, $M_m$ is the measured instantaneous mass of the aircraft, Vz is the vertical speed of the aircraft, and Vy, commonly referred to as the "best rate-of-climb speed", is the horizontal component of the speed of the aircraft, suitable for enabling the best vertical climb speed to be achieved.

The second function $f_2$ relates to altitude-changing flight while the third function $f_3$ relates to level flight. These second and third functions $f_2$, $f_3$ are represented respectively by two series of performance curves for the aircraft. A first ratio $$\left(\frac{W}{\sigma}\right)$$

is obtained for any vertical speed Vz of the aircraft, the flight power W corresponding to this vertical speed Vz, while a second ratio $$\left(\frac{W'}{\sigma}\right)_{V_y}$$

is obtained for a purely horizontal speed Vh' of the aircraft that is equal to the best rate-of-climb speed Vy, the flight power W' corresponding to this horizontal speed Vh'.

Thus, in order to determine the measured instantaneous mass $M_m$ of the aircraft for altitude-changing flight, the following steps are performed:

as a function of the vertical speed Vz of the aircraft and using a second performance curve for the aircraft applying the second function $f_2$ corresponding to the flight conditions of the aircraft determining a third value $A_3$ such that:

$$A_3 = f_2(Vz) = \left(\frac{W}{\sigma}\right) / \left(\frac{W'}{\sigma}\right)_{Vy}$$

calculating the conversion coefficient $\sigma$ such that:

$$\sigma = \left(\frac{P_0}{T_0}\right)$$

using the third value $A_3$, the flight power $W$, and the conversion coefficient $\sigma$ to calculate a fourth value $A_4$ such that:

$$A_4 = \left(\frac{W}{\sigma}\right) / A_3 = \left[\left(\frac{W'}{\sigma}\right)_{Vy}\right]$$

as a function of the fourth value $A_4$, which is such that:

$$A_4 = \left[\left(\frac{W'}{\sigma}\right)_{Vy}\right] = f_3\left(\frac{M_m}{\sigma}\right)$$

and using a third performance curve for the aircraft applying the third function $f_3$ corresponding to the flight conditions of the aircraft, determining a fifth value $A_5$ such that:

$$A_5 = \left(\frac{M_m}{\sigma}\right);$$

and using the fifth value $A_5$ to calculate the measured instantaneous mass $M_m$ of the aircraft such that:

$$M_m = A_5 \cdot \sigma$$

When the aircraft is in level flight, the functional characteristics of the aircraft are defined in particular by third and fourth series of performance curves applying the third formula:

$$\left(\frac{W'}{\sigma}\right)_{Vy} = f_3\left(\frac{M_m}{\sigma}\right)$$

and of a fourth formula:

$$\left(\frac{W}{\sigma}\right) / \left(\frac{W'}{\sigma}\right)_{Vy} = f_4\left[\left(\frac{Vh}{Vy}\right)^3, \frac{M_m}{\sigma}\right]$$

Under such conditions, $W$ is the flight power of the aircraft, $\sigma$ is the conversion coefficient, $M_m$ is the measured instantaneous mass of the aircraft, $Vh$ is the horizontal speed of the aircraft, and $Vy$ is the best rate-of-climb speed.

The third and fourth functions $f_3$, $f_4$ relate to level flight and they are represented respectively by two series of performance curves for the aircraft. The first ratio $$\left(\frac{W}{\sigma}\right)$$

is obtained for any horizontal speed $Vh$ of the aircraft, the flight power $W$ corresponding to this horizontal speed $Vh$, whereas the second ratio $$\left(\frac{W'}{\sigma}\right)_{Vy}$$

is obtained for a purely horizontal speed $Vh'$ of the aircraft that is equal to the best rate-of-climb speed $Vy$ for a best climbing vertical speed of the aircraft, the optimum power $W'$ corresponding to this horizontal speed $Vh'$. The measured instantaneous mass $M_m$ of the aircraft is then determined as the mass that makes it possible to solve the third and fourth formulas simultaneously with values for the flight power $W$ and the horizontal speed $Vh$ of the aircraft.

For example, in order to determine the measured instantaneous mass $M_m$ of the aircraft for level flight, the following steps are performed:

calculating a sixth value $A_6$ such that:

$$A_6 = \left(\frac{Vh}{Vy}\right)^3$$

as a function of the horizontal speed $Vh$ and of the best rate-of-climb speed $Vy$ of the aircraft, this best rate-of-climb speed $Vy$ being a known characteristic of the aircraft;

as a function of said sixth value $A_6$ and using a series of fourth performance curves for the aircraft applying the fourth function $f_4$, determining first pairs of values formed by a third value $A_3$ and by a fifth value $A_5$ such that:

$$A_3 = \left(\frac{W}{\sigma}\right) / \left(\frac{W'}{\sigma}\right)_{Vy}$$

and $$A_5 = \frac{M_m}{\sigma};$$

calculating the conversion coefficient $\sigma$ such that:

$$\sigma = \left(\frac{P_0}{T_0}\right);$$

using each third value $A_3$, the flight power $W$, and the conversion coefficient $\sigma$ to calculate a fourth value $A_4$ such that:

$$A_4 = \left(\frac{W}{\sigma}\right) / A_3 = \left[\left(\frac{W'}{\sigma}\right)_{Vy}\right]$$

in order to form second pairs of values formed by a fourth value $A_4$ and by a fifth value $A_5$;

determining the second value pair formed by a fourth value $A_4$ and by a fifth value $A_5$ that solves the third formula by means of a third performance curve for the aircraft applying the third function $f_3$ and corresponding to the flight conditions of the aircraft; and using the fifth value $A_5$ of this second value pair that solves the third formula to calculate the measured instantaneous mass $M_m$ of the invention such that:

$$M_m = A_5 \cdot \sigma$$

In order to obtain an estimated instantaneous mass M of the aircraft that is reliable and consolidated, it is possible to compare the measured instantaneous mass $M_m$ of the aircraft as obtained in this way with a calculated instantaneous mass $M_c$ that is determined by some other method, e.g. on the basis of the variation in the quantity of fuel present in the aircraft. This comparison of the measured instantaneous mass $M_m$ and the calculated instantaneous mass $M_c$ may be performed while the aircraft in flight in a manner that is arithmetical or indeed in a manner that is statistical.

Advantageously, this comparison makes it possible to have an estimated instantaneous mass M that is continuously available. Thus, when the measured instantaneous mass $M_m$ and the calculated instantaneous mass $M_c$ are both available simultaneously, they can be compared in order to obtain the estimated instantaneous mass M. However when the measured instantaneous mass $M_m$ is not available, because the aircraft is in a stage of flight that is not covered by usable performance curves, then no comparison is possible. Nevertheless, the availability of the calculated instantaneous mass $M_c$ still enables an estimated instantaneous mass M to be provided that is equal to the calculated instantaneous mass $M_c$. Since the non-availability of the measured instantaneous mass $M_m$ is only transient, an estimated instantaneous mass M can quickly be supplied once more.

An aircraft has at least one tank, and generally a plurality of tanks, for storing fuel. This calculated instantaneous mass $M_c$ of the aircraft can be determined on the basis of the quantity of fuel that remains in the aircraft or indeed on the quantity of fuel that has been consumed since an initial instant $t_0$, such as the instant of the aircraft taking off.

By way of example, measurements are made both of an instantaneous volume flow rate $Dv_i$ at which fuel feeding the power plant is being consumed and also of the instantaneous temperature $T_i$ of the fuel. Thereafter, an instantaneous mass flow rate $Dm_i$ of the fuel is calculated. It is then possible to determine the mass $M_{CC}$ of fuel that has been consumed since an initial instant $t_0$ by integrating the instantaneous mass flow rate $Dm_i$ of fuel since the initial instant $t_0$. The total initial mass $M_0$ of the aircraft at the initial instant $t_0$ is also known. The calculated instantaneous mass $M_c$ is finally calculated as being equal to the total initial mass $M_0$ minus the mass $M_{CC}$ of fuel that has been consumed.

It is also possible to measure both a volume $V_{CR}$ of fuel remaining in all of the tanks taken together, and also the instantaneous temperature $T_i$ of the fuel. Thereafter, the mass $M_{CR}$ of fuel remaining in all of the tanks taken together is calculated. Also known is the total initial mass $M_0$ of the aircraft and the mass $M_{CRt0}$ of fuel that was present in all of the tanks taken together at the initial instant $t_0$. The mass $M_{CC}$ of fuel that has been consumed since an initial instant $t_0$ is then determined by subtracting the mass $M_{CRt}$ of fuel remaining at an instant t from the initial mass of fuel $M_{CRt0}$. Finally, the calculated instantaneous mass $M_c$ is calculated, which is equal to the total initial mass $M_0$ of the aircraft at the initial instant $t_0$ minus the mass $M_{CC}$ of fuel that has been consumed.

Likewise, it is possible to measure both the volume $V_{CR}$ of fuel remaining in all of the tanks taken together and also of the instantaneous temperature $T_i$ of the fuel. Thereafter, the mass $M_{CR}$ of fuel remaining in all of the tanks taken together is calculated. Also known is the non-fuel initial mass $M_1$ of the aircraft at the initial instant $t_0$. The calculated instantaneous mass $M_c$ is then calculated as being equal to the non-fuel initial mass $M_1$ of the aircraft plus the mass $M_{CR}$ of fuel that remains.

It is also possible while the aircraft is in flight to compare the measured instantaneous mass $M_m$ and the calculated instantaneous mass $M_c$ in arithmetical manner, thereby determining a first discrepancy between them. Thus, if this first discrepancy is less than or equal to a predetermined error threshold, the measured instantaneous mass $M_m$ is considered as being an estimated instantaneous mass M that is reliable and usable, whereas if this first discrepancy is greater than the error threshold, the measured instantaneous mass $M_m$ is considered as being an estimated instantaneous mass M that is not usable, and an alert is issued in order to inform the pilot of the aircraft.

Furthermore, if this first discrepancy is large and positive, it also makes it possible to identify either that payload has been off-loaded or that a slung load has been released. In contrast, if this first discrepancy is negative and large in absolute value, it can be deduced that a payload has been loaded or that a slung load has been attached.

The measured instantaneous mass $M_m$ determined on the basis of performance curves for the aircraft takes account of any change in the total mass of the aircraft, including loading or unloading payload. In contrast, the calculated instantaneous mass $M_c$ takes account only of variation in the quantity of fuel in the aircraft, independently of the total mass of the aircraft.

When a first discrepancy is large in absolute value, the pilot may confirm that a payload has been loaded or unloaded, thereby confirming the reliability of the measured instantaneous mass $M_m$.

It is also possible to compare a first difference between the measured instantaneous mass $M_m$ and the initial mass together with a second difference between the calculated instantaneous mass $M_c$ and the initial mass. The measured instantaneous mass $M_m$ and the calculated instantaneous mass $M_c$ may be determined by way of example at an instant t, and the initial mass may be determined at an initial instant $t_0$. This initial instant $t_0$ corresponds to a particular moment in flight, such as loading or unloading payload, for example, and this initial mass has a value that is fixed and constant. This initial instant $t_0$ is preferably the instant the aircraft takes off and the initial mass is the mass of the aircraft at takeoff.

It is then possible to determine a second discrepancy between the first difference and the second difference. If this second discrepancy is less than or equal to the error threshold, then the measured instantaneous mass $M_m$ is considered as being an estimated instantaneous mass M that is reliable and usable, whereas if this second discrepancy is greater than the error threshold, then the measured instantaneous mass $M_m$ is considered being an estimated instantaneous mass M that is not usable, and an alert is issued in order to inform the pilot.

In addition, if this second discrepancy is large in absolute value, it can also make it possible to identify that a payload of the aircraft has been loaded or unloaded, as mentioned above.

It is also possible to compare the values of the measured instantaneous mass $M_m$ and of the calculated instantaneous mass $M_c$ in statistical manner during a flight of the aircraft in order to determine a value for the estimated instantaneous mass M that is consolidated, reliable, and accurate.

It is thus possible to compare the variation in the instantaneous mass of the aircraft by using the various values of the measured instantaneous mass $M_m$ with the variation in the calculated instantaneous mass $M_c$ of the aircraft during a flight by statistical analysis. It is also possible during a flight to use statistical analysis to compare the variation of the first differences with the variation of the second differences.

By way of example, during the flight of the aircraft, it is possible to calculate a first mean or a second mean respectively of the first discrepancies or of the second discrepancies as determined between the instant t and the initial instant $t_0$. Thereafter, this first mean or this second mean can be compared with an error threshold in order to determine whether the measured instantaneous mass $M_m$ can be considered as being an estimated instantaneous mass M that is reliable and consolidated, and consequently that is usable.

In addition to the first mean or the second mean, it is possible to calculate a first or a second standard deviation associated respectively with the first and second discrepancies and then to analyze the first or second standard deviation in order to determine whether the measured instantaneous mass $M_m$ can be considered as being an estimated instantaneous mass M that is reliable and consolidated.

On the basis of the values of the measured instantaneous mass $M_m$ and of the calculated instantaneous mass $M_c$ as determined between an instant t and the initial instant $t_0$, it is also possible to recalculate the initial mass of the aircraft at the initial instant $t_0$ and thus verify that the initial mass is indeed constant between the instant t and the initial instant $t_0$. Such statistical analysis can be performed on the basis of the values for the measured instantaneous mass $M_m$ and for the mass of fuel consumed by the aircraft during a flight.

Furthermore, such statistical analysis can be performed by means of at least one Kalman filter, thereby making it possible to consolidate the estimated instantaneous mass M of the aircraft by comparing the values for the measured instantaneous mass $M_m$ and for the calculated instantaneous mass $M_c$, e.g. via the mass $M_{CC}$ of fuel consumed by the aircraft. The following steps are performed:

initially determining a measurement vector $Z_m$ such as:

$$Z_m \begin{pmatrix} M_m \\ M_{CC} \end{pmatrix},$$

where $M_m$ is the measured instantaneous mass of the invention and $M_{CC}$ is the mass of fuel consumed by the aircraft;

defining a state vector X that is to be determined such as:

$$X \begin{pmatrix} M \\ M_0 \end{pmatrix},$$

where M is an estimated instantaneous mass of the aircraft and $M_0$ is the total initial mass of the aircraft;

defining a state equation:

$$\dot{X} = A \cdot X + B \cdot Dm,$$

with:

$$A = \begin{bmatrix} 0 & 0 \\ 0 & 0 \end{bmatrix}$$

and $$B = \begin{bmatrix} -1 \\ 0 \end{bmatrix},$$

$Dm_i$ being the instantaneous mass flow rate of the fuel, which is equal to the derivative of the mass $M_{CC}$ of fuel consumed by the aircraft, $\dot{X}$ being the derivative of the state vector X;

defining a measurement equation:

$$Z_m = C \cdot x$$

with:

$$C = \begin{bmatrix} 1 & 0 \\ -1 & 1 \end{bmatrix};$$

and applying the state equation and the measurement equation to a Kalman filter in order to determine the state vector X, and consequently determining the estimated instantaneous mass M and the total initial mass $M_0$ of the aircraft.

In analogous manner, and using at least one Kalman filter, it is also possible to consolidate the estimated instantaneous mass M of the aircraft by means of the mass $M_{CR}$ of fuel remaining in the tanks of the aircraft.

The present invention also provides a device for estimating the instantaneous mass of a rotary wing aircraft. A rotary wing aircraft generally comprises a power plant having at least one engine and a main power transmission gearbox, the main gearbox driving at least one main rotor and an anti-torque rotor in rotation. The aircraft also comprises a plurality of sensors supplying measurements about the environment of the aircraft and also about the operation of the aircraft and of its equipment, such as its power plant and the main rotor, in particular.

This device for estimating the instantaneous mass comprises at least one calculation means and at least one memory, the memory storing performance curves for the aircraft and calculation instructions. The calculation means receives the measurements from sensors and can apply the calculation instructions in order to perform the above-described method of estimating the instantaneous mass of a rotary wing aircraft.

The device for estimating the instantaneous mass may include at least one Kalman filter in order to compare in statistical manner the variation in the measured instantaneous mass $M_m$ with the variation in the calculated instantaneous mass $M_c$ of the aircraft during a flight, and thereby determine a consolidated, accurate, and reliable value for the estimated instantaneous mass M of the aircraft.

BRIEF DESCRIPTION OF THE SEVERAL VIEWS OF THE DRAWINGS

The invention and its advantages appear in greater detail in the context of the following description of examples given by way of illustration and with reference to the accompanying drawings, in which.

Elements shown in more than one of the figures are given the same references in each of them.

DETAILED DESCRIPTION OF THE INVENTION

Figure 1:
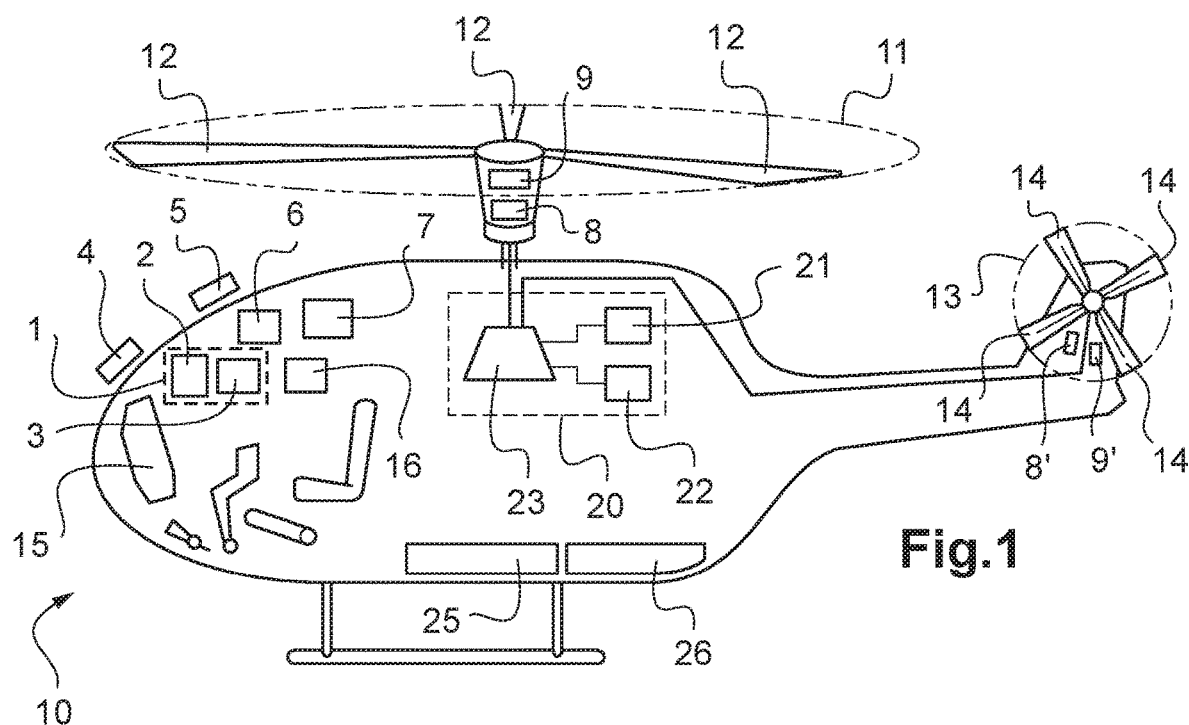
FIG. 1 shows a rotary wing aircraft having a device for estimating the instantaneous mass of the aircraft.

FIG. 1 shows a rotary wing aircraft 10 having a main rotor 11 with main blades 12, and a tail rotor 13 having in particular an anti-torque function, the tail rotor 13 being provided with secondary blades 14. The aircraft 10 also has a plurality of sensors 4-9, an instrument panel 15, a power plant 20 having two turboshaft engines 21 and 22, and a main power transmission gearbox 23 driving the main rotor 11 and the tail rotor 13 in rotation. The sensors 4-9 serve to measure various kinds of information relating to the environment of the aircraft 10, to the operating state of the aircraft 10, and to the operating state of the main rotor 11.

Finally, the aircraft 10 has a device 1 for estimating the instantaneous mass of the aircraft 10, which device is provided with calculation means 2 and a memory 3.

Atmospheric sensors 4, 5 serve to measure atmospheric characteristics relating to the environment of the aircraft 10 and comprise, by way of example: means for measuring the atmospheric pressure $P_0$, and means for measuring the outside temperature $T_0$ around the aircraft 10.

The sensors 6, 7 serve to measure flight characteristics relating to the speed and to the position of the aircraft 10. The speed sensor 6 serves for example to measure the speed of the aircraft 10 relative to air in three preferred directions relative to the aircraft 10, such as the longitudinal, transverse, and elevation directions. This speed of the aircraft 10 relative to air can be resolved into a horizontal speed Vh and a vertical speed Vz, where the horizontal and vertical directions are defined in a terrestrial reference frame by attitude and heading determination means 16 such as an attitude and heading reference system (AHRS) included in the aircraft 10. Furthermore, the vertical speed Vz is generally determined by calculating the derivative of the altitude variation of the aircraft as measured by static pressure measurements.

By way of example, the sensor 7 is a radioaltimeter determining the height Hz of the aircraft 10 relative to the ground.

Finally, power sensors 8, 9 and 8', 9' serve to measure power characteristics relating respectively to the operation of the main rotor 11 and of the tail rotor 13 of the aircraft 10. By way of example, the sensors 8, 9 are means respectively for measuring the torque $C_R$ and the real speed of rotation NR of the main rotor 11. Likewise, the sensors 8', 9' are respectively means for measuring the torque $C_{RAG}$ and the real speed of rotation $NR_{AC}$ of the tail rotor 13.

Additional sensors that are not shown in the figures may also serve to measure power characteristics relating to the operation of the power plant 20. These additional sensors may for example be means for measuring the torque $C_{im}$ and the speed of rotation $NR_{im}$ of a main outlet shaft from the power plant 20.

Figure 2:
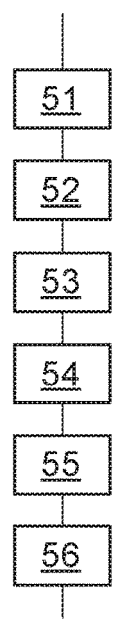
FIG. 2 is a block diagram showing a method of estimating the instantaneous mass of the aircraft.

The device 1 may perform a method of estimating the instantaneous mass of the aircraft 10 as shown diagrammatically in FIG. 2. The memory 3 stores performance curves for the aircraft and calculation instructions. The calculation means 2 apply these calculation instructions in order to perform the method.

The method shown in FIG. 2 comprises six steps.

During a first step 51, flight characteristics of the aircraft 10 are measured such as the horizontal speed Vh and the vertical speed Vz of the aircraft 10 by means of the speed sensor 6, and such as the height Hz of the aircraft 10 relative to the ground by means of the radioaltimeter 7.

During a second step 52, power characteristics of the aircraft 10 are measured such as the torque $C_R$ and the real speed of rotation NR of the main rotor 11, by using the power sensors 8, 9, and also the torque $C_{RAG}$ and the real speed of rotation $NR_{AC}$ of said anti-torque rotor 13, by means of the power sensors 8', 9'.

During a third step 53, atmospheric characteristics relating to the environment of the aircraft 10 are measured, such as the atmospheric pressure $P_0$ and the temperature $T_0$ of the air around the aircraft 10 by means of the atmospheric sensors 4, 5.

During a fourth step 54, the flight power W of the aircraft 10 is determined. This flight power W, which serves to provide the aircraft 10 with lift and movement, is shared between the main rotor 11 and the tail rotor 13. This flight power W is thus equal to the sum of the powers consumed by the main rotor 11 and by the tail rotor 13. Furthermore, this flight power W is equal to the total power delivered by the power plant 20 minus the accessory power $W_{acc}$ needed for powering various pieces of equipment on board the aircraft 10.

During a fifth step 55, an operating point of the aircraft 10 is determined on at least one series of performance curves for the aircraft 10 as a function of the flight characteristics of the aircraft 10, of the atmospheric characteristics, and of the flight power W.

These series of performance curves are constituted by a plurality of curves, as shown in FIGS. 4 to 7, as a function of atmospheric characteristics or of characteristics of the aircraft 10, e.g. such as its mass. These series of performance curves are specific to the aircraft 10 and they serve to characterize the operation of the aircraft 10, and in particular its flight power W during different stages of flight. These series of performance curves cover the main stages of flight of the aircraft 10 which comprise: hovering for the first curves shown in FIG. 4; altitude-changing for the second curves shown in FIG. 5; or level flight for the third and fourth curves shown respectively in FIGS. 6 and 7.

In order to determine the stage of flight of the aircraft 10, and consequently the or each series of performance curves to be taken into account, it is possible to use a selection algorithm that makes use of the values for the horizontal speed Vh and the vertical speed Vz of the aircraft 10.

Specifically, hovering flight corresponds to a horizontal speed Vh and to a vertical speed Vz of the aircraft 10 that are both substantially zero. Altitude-changing flight covers both climbing flight and descending flight, and corresponds to a vertical speed Vz and to a horizontal speed Vh that are not zero. Level flight corresponds to a vertical speed Vz that is substantially zero and to a horizontal speed Vh that is not zero.

During a sixth step 56, the measured instantaneous mass $M_m$ of the aircraft 10 is deduced from the performance curves shown in FIGS. 4 to 7, from the flight characteristics of the aircraft 10, from the atmospheric characteristics, and from the flight power W.

Figure 4:
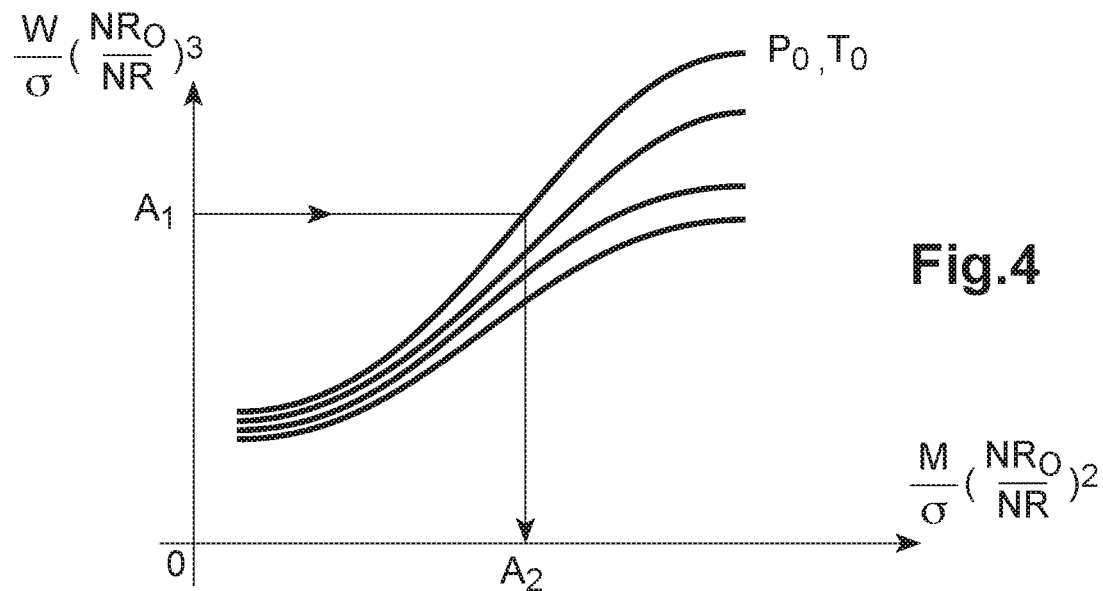

When the aircraft 10 is hovering, use is made of the first series of performance curves as shown in FIG. 4, which curves apply a first formula:

$$\frac{W}{\sigma} \cdot \left(\frac{NR_0}{NR}\right)^3 = k \cdot f_1\left[\frac{M_m}{\sigma} \cdot \left(\frac{NR_0}{NR}\right)^2\right]$$

Each first curve in this series corresponds to a pair of values comprising the atmospheric pressure and the air temperature around the aircraft 10.

The conversion coefficient σ such that:

$$\sigma = \left(\frac{P_0}{T_0}\right)$$

is calculated initially as a function of the atmospheric pressure $P_0$ expressed in millibars (mb) and of the temperature $T_0$ of the air around the aircraft 10 expressed in kelvins (K) measured by means of the atmospheric sensors 4, 5.

A first value $A_1$ is then calculated such that:

$$A_1 = \frac{W}{\sigma} \cdot \left(\frac{NR_0}{NR}\right)^3,$$

where $NR_0$ is a setpoint speed of rotation for the main rotor 11.

Thereafter, as a function of the first value $A_1$ and using the first performance curve of the aircraft 10 that corresponds to the atmospheric pressure $P_0$ and to the air temperature $T_0$ around the aircraft 10, a second value $A_2$ is determined such that:

$$A_2 = f_1\left[\frac{M_m}{\sigma} \cdot \left(\frac{NR_0}{NR}\right)^2\right] = \frac{\frac{M_m}{\sigma} \cdot \left(\frac{NR_0}{NR}\right)^2}{k}$$

as shown in FIG. 4.

Figure 3:
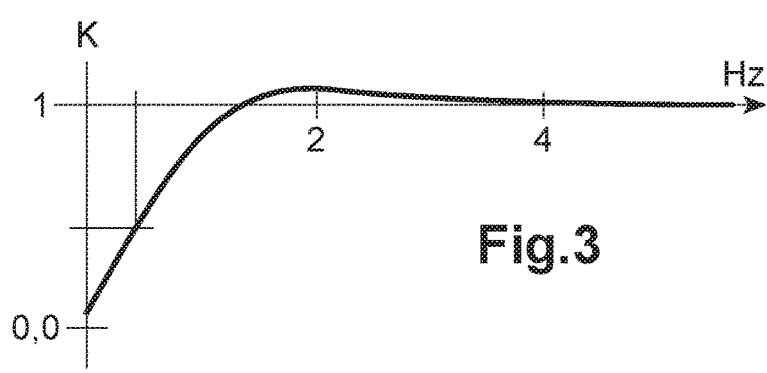
FIGS. 3 to 7 are curves showing the performance of the aircraft.

The ground influence coefficient k is then determined depending on the height Hz of the aircraft 10 relative to the ground, e.g. as measured by the radioaltimeter 7. The ground influence coefficient k is specific to each aircraft 10 and, as shown in FIG. 3, it is defined by a ground influence curve as a function of the height Hz of the aircraft 10 relative to the ground, expressed as a function of a number of diameters of the main rotor 11. In the curve shown in FIG. 3, the ground influence coefficient k lies in the range 0.9 to 1.1. The ground influence coefficient k is generally equal to unity, which corresponds to hovering flight of the aircraft 10 in an OGE zone, i.e. a zone out of ground effect.

Finally, in particular on the basis of the second value $A_2$, the measured instantaneous mass $M_m$ of the aircraft 10 is calculated as follows:

$$M_m = k \cdot A_2 \cdot \sigma \cdot \left(\frac{NR}{NR_0}\right)^2$$

Figure 5:
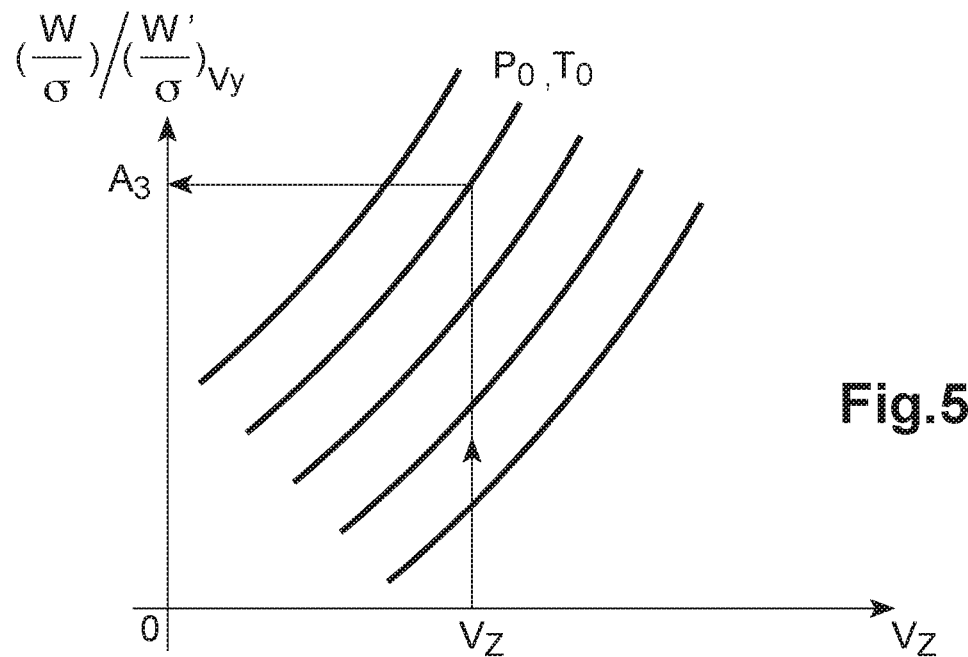

When the aircraft 10 is in altitude-changing flight, use is made of a second series of performance curves as shown in FIG. 5, which curves apply a second formula:

$$\left(\frac{W}{\sigma}\right) \bigg/ \left(\frac{W'}{\sigma}\right)_{V_y} = f_2(V_z)$$

Figure 6:
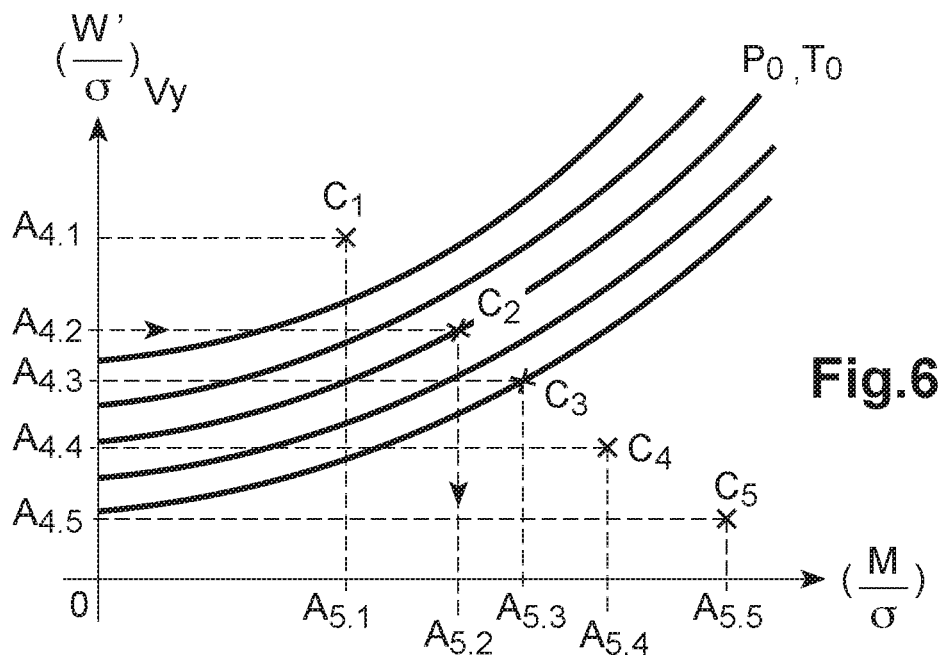

Use is also made of a first series of performance curves as shown in FIG. 6, which curves apply a third formula:

$$\left(\frac{W'}{\sigma}\right)_{V_y} = f_3\left(\frac{M_m}{\sigma}\right)$$

Specifically, the third formula corresponds to level flight of the aircraft 10 with a horizontal speed Vh' equal to the best rate-of-climb speed Vy of the aircraft 10, the ratio $$\left(\frac{W'}{\sigma}\right)_{V_y}$$

being obtained for such a speed Vh' of the aircraft 10. Each second and third curve corresponds to a pair of values for atmospheric pressure and for air temperature around the aircraft 10.

As a function of the vertical speed Vz of the aircraft 10, and using the second performance curve that corresponds to the atmospheric pressure $P_0$ and to the temperature $T_0$ of the air around the aircraft 10, to determine a third value $A_3$ such that:

$$A_3 = f_2(V_z) = \left(\frac{W}{\sigma}\right) \bigg/ \left(\frac{W'}{\sigma}\right)_{V_y}$$

as shown in FIG. 5.

Thereafter, the conversion coefficient σ is calculated such that:

$$\sigma = \left(\frac{P_0}{T_0}\right)$$

Thereafter, the third value $A_3$, the flight power W, and the conversion coefficient σ are used to calculate a fourth value $A_4$ such that:

$$A_4 = \left(\frac{W}{\sigma}\right) \bigg/ A_3 = \left[\left(\frac{W'}{\sigma}\right)_{V_y}\right]$$

As a function of the fourth value $A_4$, which is such that:

$$A_4 = \left[\left(\frac{W'}{\sigma}\right)_{V_y}\right] = f_3\left(\frac{M_m}{\sigma}\right)$$

use is made of the third performance curve that corresponds to the atmospheric pressure $P_0$ and to the temperature $T_0$ of the air around the aircraft 10 to determine a fifth value $A_5$ such that:

$$A_5 = \left(\frac{M_m}{\sigma}\right),$$

as shown in FIG. 6. The fourth and fifth values in question are written respectively $A_{4.2}$ and $A_{5.2}$ in FIG. 6.

Finally, the fifth value $A_5$ and the conversion coefficient $\sigma$ are used to calculate the measured instantaneous mass $M_m$ such that $M_m = A_5 \cdot \sigma$.

Figure 7:
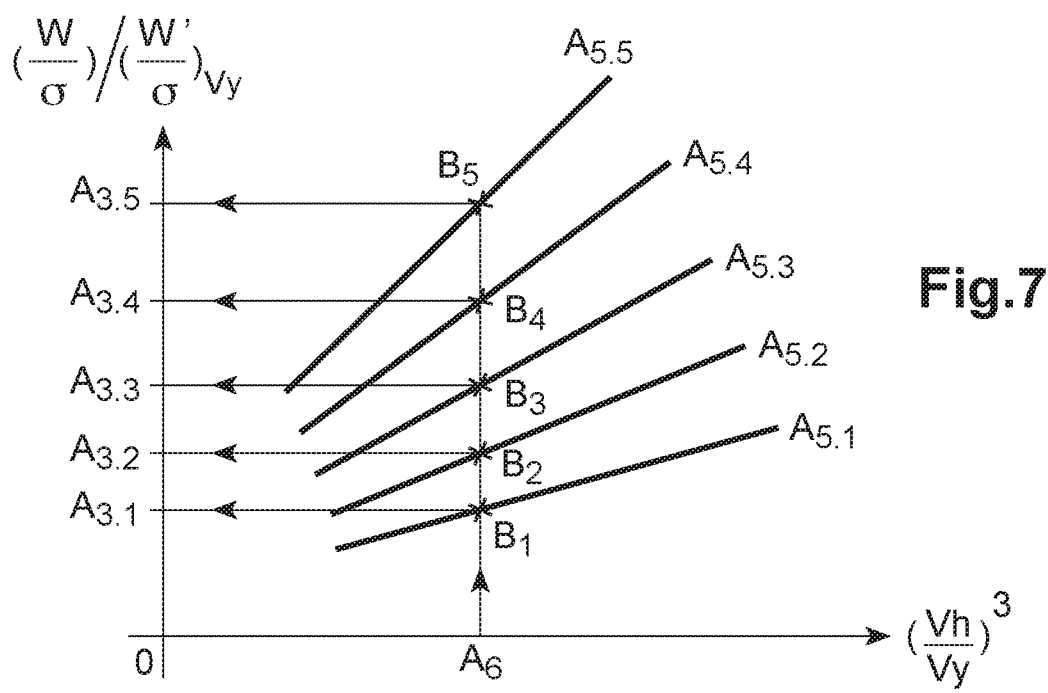

When the aircraft 10 is level flight, two series of third and fourth performance curves as shown in FIGS. 6 and 7 are used that apply respectively the third formula:

$$\left(\frac{W'}{\sigma}\right)_{V_y} = f_3 \frac{M_m}{\sigma}$$

and a fourth formula:

$$\left(\frac{W}{\sigma}\right) \Big/ \left(\frac{W'}{\sigma}\right)_{V_y} = f_4 \left[\left(\frac{V_h}{V_y}\right)^3, \frac{M_m}{\sigma}\right]$$

Each fourth curve corresponds to a third ratio:

$$\left(\frac{M_m}{\sigma}\right).$$

The measured instantaneous mass $M_m$ that enables the third and fourth formulas to be solved simultaneously is then determined depending on the horizontal power value W and the horizontal speed value Vh of the aircraft 10.

In order to solve these two formulas simultaneously, it is possible by way of example to begin by calculating a sixth value $A_6$ such that:

$$A_6 = \left(\frac{V_h}{V_y}\right)^3$$

as a function of the horizontal speed Vh and the best rate-of-climb speed Vy of the aircraft 10.

Thereafter, as a function of this sixth value $A_6$ and using the series of fourth performance curves, first pairs of values $B_i$ made up of a third value $A_3$ and a fifth value $A_5$ are determined such that:

$$A_3 = \left(\frac{W}{\sigma}\right) \Big/ \left(\frac{W'}{\sigma}\right)_{V_y}$$

and $$A_5 = \frac{M_m}{\sigma}.$$

As shown in FIG. 6, this produces five first pairs of values:

$$B_i \begin{bmatrix} A_{3,i} \\ A_{5,i} \end{bmatrix}$$

each made up of a third value $A_{3.1}$-$A_{3.5}$ and of a fifth value $A_{5.1}$-$A_{5.5}$.

Each fifth value $A_{5,i}$ corresponds to a fourth performance curve, and each third value $A_{3,i}$ together with the sixth value $A_6$ forms a point on the fourth curve.

Thereafter, the conversion coefficient $\sigma$ is calculated such that:

$$\sigma = \left(\frac{P_0}{T_0}\right).$$

Thereafter, each third value $A_{3.1}$-$A_{3.5}$ for the flight power W and the conversion coefficient $\sigma$ are used to calculate a fourth value $A_{4.1}$-$A_{4.5}$ such that:

$$A_4 = \left(\frac{W}{\sigma}\right) \Big/ A_3 = \left[\left(\frac{W'}{\sigma}\right)_{V_y}\right]$$

Second pairs of values $$C_i \begin{bmatrix} A_{4,i} \\ A_{5,i} \end{bmatrix}$$

are then formed that are respectively made up of a fourth value $A_{4.1}$-$A_{4.5}$ and a fifth value $A_{5.1}$-$A_{5.5}$.

Among these second pairs $C_i$, only one serves, as shown in FIG. 6, to define an operating point situated on the third performance curve corresponding to the atmospheric pressure $P_0$ and to the temperature $T_0$ or at least situated in the proximity of this third performance curve. It is thus possible to determine the second pair $C_2$ constituted by a fourth value $A_{4.2}$ and a fifth value $A_{5.2}$ that solves the third formula as a function of the atmospheric pressure $P_0$ and the temperature $T_0$.

The other second pairs $C_1$, $C_3$-$C_5$ do not enable the third formula to be solved while taking account of the atmospheric pressure $P_0$ and the temperature $T_0$. By way of example, it can be seen that the operating point corresponding to the second pair $C_3$ is indeed situated on a fourth performance curve, but that it does not correspond to the atmospheric pressure $P_0$ and the temperature $T_0$.

Finally, the fifth value $A_{5.2}$ of the second pair $C_2$ is used to calculate the measured instantaneous mass $M_m$ of the aircraft 10 such that $M_m = A_{5.2} \cdot \sigma$.

This method of estimation thus enables the measured instantaneous mass $M_m$ to be determined accurately in flight.

Advantageously, this accurate measured instantaneous mass $M_m$ can be used to optimize the use of the aircraft, e.g. by accurately determining the flight path needed for performing a particular maneuver of the aircraft 10 or indeed the payload that can be transported by the aircraft 10.

This measured instantaneous mass $M_m$ can then be displayed on an instrument or on a screen present on the instrument panel 15 of the aircraft 10 in order to inform the pilot.

Furthermore, in order to obtain an estimated instantaneous mass M of the aircraft that is reliable and consolidated, it is possible to compare the measured instantaneous mass $M_m$ with a calculated instantaneous mass $M_c$ for the aircraft 10 that is obtained in some other manner, e.g. on the basis of the variation in the quantity of fuel present in the aircraft 10. This comparison between the measured instantaneous mass $M_m$ and the calculated instantaneous mass $M_c$ can be performed during a flight of the aircraft 10 in an arithmetical manner or indeed in a statistical manner.

The aircraft 10 shown in FIG. 1 has two tanks 25, 26 serving to store the fuel of the aircraft 10. The calculated instantaneous mass $M_c$ of the aircraft 10 can be determined on the basis of the quantity of fuel that remains in the aircraft 10 or indeed on the quantity of fuel that has been consumed since an initial instant $t_0$, such as the instant the aircraft 10 took off.

It is also possible during the flight of the aircraft 10 to compare the measured instantaneous mass $M_m$ and the calculated instantaneous mass $M_c$ in arithmetical manner by determining a first discrepancy between the measured instantaneous mass $M_m$ and the calculated instantaneous mass $M_c$. The measured instantaneous mass $M_m$ is then considered as being a reliable estimated instantaneous mass M that is suitable for use whenever this first discrepancy is less than or equal to a predetermined error threshold.

Furthermore, when the absolute value of this first discrepancy is large, it may serve to identify a change in the level of the payload of the aircraft 10. This change may correspond to off-loading at least a portion of this payload, or to loading at least a portion.

It is also possible to compare the values of the measured instantaneous mass $M_m$ and of the calculated instantaneous mass $M_c$ during the course of a flight of the aircraft 10 in statistical manner so as to determine an estimated instantaneous mass M that is consolidated, reliable, and accurate.

By way of example, it is possible to calculate a first mean of these first discrepancies determined during the flight of the aircraft 10 since the initial instant $t_0$. Thereafter, it is possible to compare this first mean with the error threshold as mentioned above or indeed to analyze the first standard deviation of this first mean.

It is thus possible, during a flight, to compare variation in the instantaneous mass M of the aircraft 10 as estimated using the different values of the measured instantaneous mass $M_m$, with variation in the calculated instantaneous mass $M_c$ by performing statistical analysis.

Figure 8:
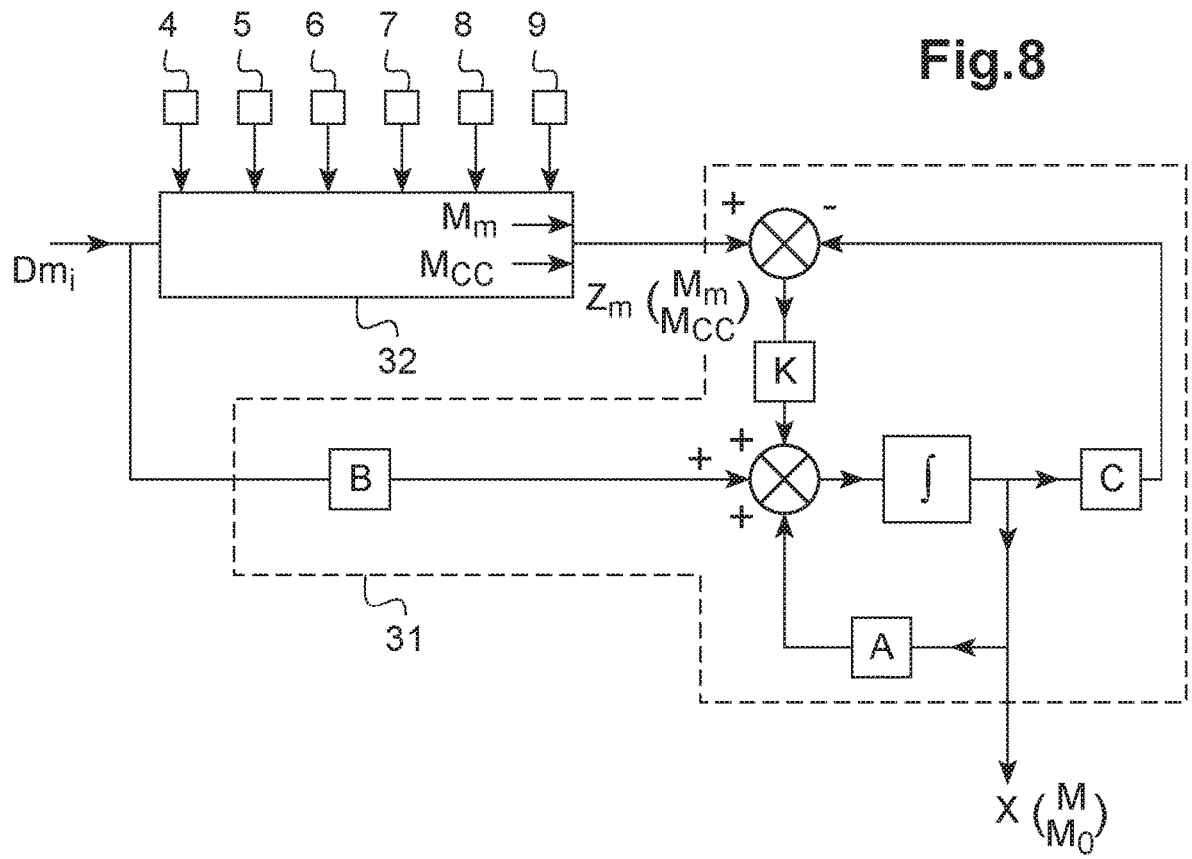
FIG. 8 shows an architecture using a Kalman filter in order to determine the estimated instantaneous mass M.

Such statistical analysis may be performed by means of a Kalman filter 31. A diagram for such an architecture is shown in FIG. 8. It is thus possible to consolidated the estimated instantaneous mass M by comparing the values of the measured instantaneous mass $M_m$ and of the calculated instantaneous mass $M_c$, e.g. by means of the mass $M_{CC}$ of the fuel consumed by the aircraft 10.

A measurement vector $$Z_m \begin{pmatrix} M_m \\ M_{CC} \end{pmatrix}$$

is determined initially, the measured instantaneous mass $M_m$ and the consumed fuel mass $M_{CC}$ being determined by means of a computer 32. As described above, the measured instantaneous mass $M_m$ is determined from performance curves for the aircraft 10 and the consumed fuel mass $M_{CC}$ is determined from the fuel consumption, and more precisely from the instantaneous mass flow rate $Dm_i$ of the fuel starting from an initial instant $t_0$. The computer 32 and the Kalman filter 31 are preferably incorporated in the calculation means 2.

Thereafter, a state vector $$X \begin{pmatrix} M \\ M_0 \end{pmatrix}$$

that is to be determined is defined, where M is the estimated instantaneous mass of the aircraft 10 and $M_0$ is its total initial mass at the initial instant $t_0$. The total initial mass $M_0$ is thus a constant and its derivative is zero.

Furthermore, the estimated instantaneous mass M is equal to the measured instantaneous mass $M_m$ and the consumed fuel mass $M_{CC}$ is the difference between the total initial mass $M_0$ and the estimated instantaneous mass M while taking account of measurement errors or inaccuracies $\Delta_{mes}$ such that $M=M_m+\Delta_{mes}$ and $M_{CC}=M_0-M+\Delta_{mes}$.

It is also possible to write that the estimated instantaneous mass M is equal to the difference between the total initial mass $M_0$ and the consumed fuel mass $M_{CC}$ ignoring measurement errors or inaccuracies $\Delta_{mes}$, such that $M=M_0-M_{CC}+\Delta_{mes}$. Specifically, the derivative of this estimated instantaneous mass M is equal to the derivative of the consumed fuel mass $M_{CC}$, which is the instantaneous mass flow rate $Dm_i$ of the fuel, the total initial mass $M_0$ being a constant. This gives $\dot{M}=-Dm_i$.

A state equation $\dot{X}=A \cdot X+B \cdot Dm_i$ and a measurement equation $Z_m=C \cdot X$ are then defined with the following matrices:

$$A = \begin{bmatrix} 0 & 0 \\ 0 & 0 \end{bmatrix}, B = \begin{bmatrix} -1 \\ 0 \end{bmatrix} \text{ and } C = \begin{bmatrix} 1 & 0 \\ -1 & 1 \end{bmatrix},$$

$\dot{X}$ being the derivative of the state vector X.

Finally, the state equation and the measurement equation are applied to the Kalman filter 31 in order to determine the state vector X. This produces values for the estimated instantaneous mass M and for the total initial mass $M_0$ at each instant t during the flight of the aircraft 10.

Furthermore, since the matrix A is a zero matrix, implementation of the Kalman filter 31 can be simplified compared with the generic representation of FIG. 8 by omitting the link containing the matrix A.

In addition, state noise $Br_{state}$ and noise associated with measurements $Br_{mes}$ need to be taken into account in these equations which are then written:

$$\dot{X}=A \cdot X+B \cdot Dm_i+Br_{state} \text{ and } Z_m=C \cdot X+Br_{mes}.$$

The value of this state noise $Br_{state}$ may be defined by way of example depending on the confidence and/or the representivity of this state equation, whereas the value for the noise associated with measurements $Br_{mes}$ is defined depending on the accuracy margin associated with the measurement performance of the sensors themselves. Consequently, if the difference between the measured instantaneous mass $M_m$ and the estimated instantaneous mass M is less than or equal to an error margin corresponding to this noise associated with the measurement $Br_{mes}$ and to this state noise $Br_{state}$, then the estimated instantaneous mass M is considered as being reliable and usable. In contrast, if the difference between the measured instantaneous mass $M_m$ and the estimated instantaneous mass M is greater than this error margin, then this estimated instantaneous mass M is considered as being unreliable and not usable.

Furthermore, the total initial mass $M_0$ is normally a constant that corresponds to the total mass of the aircraft 10 at the initial instant $t_0$. Advantageously, the method of the invention then makes it possible to identify variations in this total initial mass $M_0$ corresponding in particular to the aircraft taking on payload or off-loading payload.

Figure 9:
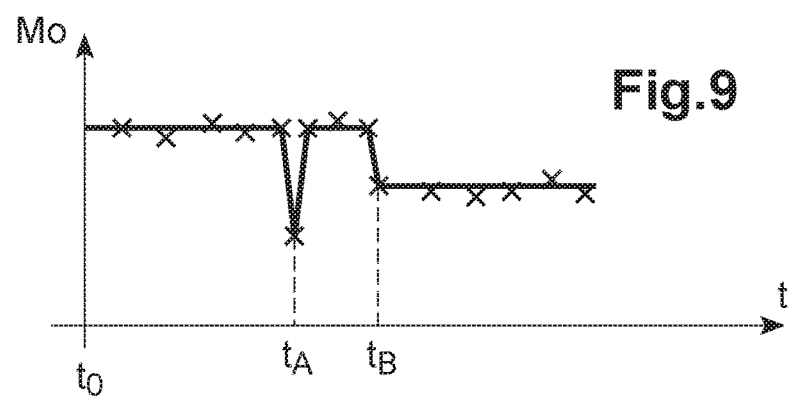
FIG. 9 is a curve showing how the initial mass $M_0$ as estimated by this architecture varies.

The graph of FIG. 9 shows how values for the total initial mass $M_0$ defined by the state vector $$X\begin{pmatrix} M \\ M_0 \end{pmatrix}$$

vary as a function of time t. It can be seen that this total initial mass $M_0$ drops briefly at the instant $t_A$, which corresponds in fact to a measurement error or to a calculation error, such as using a series of performance curves that do not actually correspond to the stage of flight of the aircraft 10. It can also be seen that the total initial mass $M_0$ drops suddenly and lastingly as from instant $t_B$. Since this drop in the total initial mass $M_0$ is durable and substantially constant after the instant $t_B$ it is possible to determine that some of the payload of the aircraft 10 has been off-loaded.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of estimating the instantaneous mass of a rotary wing aircraft, the aircraft having a power plant with at least one engine and a main power transmission gearbox, the main gearbox driving at least a main rotor and an anti-torque rotor in rotation, the method comprising the following steps during a flight:
   measuring flight characteristics of the aircraft;
   measuring power characteristics of the aircraft;
   measuring atmospheric characteristics of the environment of the aircraft;
   determining a flight power W of the aircraft based at least in part on the power characteristics of the aircraft;
   determining an operating point of the aircraft on at least one series of performance curves for the aircraft as a function of the flight characteristics of the aircraft, of the atmospheric characteristics of the environment of the aircraft, and of the flight power W of the aircraft; and
   deducing from the determined operating point of the aircraft on the at least one series of performance curves for the aircraft a measured instantaneous mass $M_m$ of the aircraft; and
   wherein the flight power W is equal to drive power delivered by the power plant minus accessory power $W_{acc}$ needed for powering equipment of the aircraft.

2. The method according to claim 1, wherein a selection algorithm is used to determine each series of performance curves for the aircraft that is to be used depending on the values of the horizontal speed Vh and the vertical speed Vz of the aircraft.

3. The method according to claim 1, wherein, when the aircraft is in hovering flight, the horizontal speed Vh and the vertical speed Vz of the aircraft being substantially zero, the functional characteristics of the aircraft are defined in particular by a series of first performance curves using a first formula:

$$\frac{W}{\sigma} \cdot \left(\frac{NR_0}{NR}\right)^3 = k \cdot f_1\left[\frac{M_m}{\sigma} \cdot \left(\frac{NR_0}{NR}\right)^2\right]$$

where W is the flight power of the aircraft, $\sigma$ is a conversion coefficient, k is an influence coefficient for the influence of the ground on the behavior of the aircraft as a function of the height Hz of the aircraft relative to the ground, $M_m$ is the measured instantaneous mass of the aircraft, $NR_0$ is a setpoint speed of rotation for the main rotor, NR is the real speed of rotation of the main rotor, and $f_1$ is a first function represented by a series of first performance curves for the aircraft, and the following steps are performed:
   calculating the conversion coefficient $\sigma$ such that:

$$\sigma = \left(\frac{P_0}{T_0}\right)$$

calculating a first value $A_1$ such that:

$$A_1 = \frac{W}{\sigma} \cdot \left(\frac{NR_0}{NR}\right)^3$$

as a function of the first value $A_1$ and using a first performance curve for the aircraft applying the first function $f_1$ corresponding to the flight conditions of the aircraft, determining a second value $A_2$ such that:

$$A_2 = f_1\left[\frac{M_m}{\sigma} \cdot \left(\frac{NR_0}{NR}\right)^2\right] = \frac{\frac{M_m}{\sigma} \cdot \left(\frac{NR_0}{NR}\right)^2}{k}$$

determining the influence coefficient k depending on the height Hz of the aircraft relative to the ground; and
using the second value $A_2$ to calculate the measured instantaneous mass $M_m$ of the aircraft such that:

$$M_m = k \cdot A_2 \cdot \sigma \cdot \left(\frac{NR}{NR_0}\right)^2.$$

4. The method according to claim 1, wherein, when the aircraft is in altitude-changing flight, the horizontal speed Vh and the vertical speed Vz of the aircraft being non-zero, functional characteristics of the aircraft are defined by second and third series of performance curves respectively applying a second formula:

$$\frac{\left(\frac{W}{\sigma}\right)}{\left(\frac{W'}{\sigma}\right)_{V_y}} = f_2(V_z)$$

and a third formula:

$$\left(\frac{W'}{\sigma}\right)_{V_y} = f_3\left(\frac{M_m}{\sigma}\right)$$

where W is the flight power of the aircraft, σ is a conversion coefficient, $M_m$ is the measured instantaneous mass of the aircraft, Vz is the vertical speed of the aircraft, Vy is the best rate-of-climb speed of the aircraft, $f_2$ and $f_3$ are respectively second and third functions represented by two series of performance curves for the aircraft, a first ratio $$\left(\frac{W}{\sigma}\right)$$

is obtained for any vertical speed Vz of the aircraft, the flight power W corresponding to the vertical speed Vz, a second ratio $$\left(\frac{W'}{\sigma}\right)_{Vy}$$

is obtained for a speed Vh' of the aircraft that is horizontal only and that is equal to the best rate-of-climb speed Vy, an optimum power W' corresponding to the horizontal speed Vh', and the following steps are performed:

as a function of the vertical speed Vz of the aircraft and using a second performance curve for the aircraft applying the second function $f_2$ corresponding to the flight conditions of the aircraft, determining a third value $A_3$ such that:

$$A_3 = f_2(Vz) = \frac{\left(\frac{W}{\sigma}\right)}{\left(\frac{W'}{\sigma}\right)_{Vy}}$$

calculating the conversion coefficient σ such that:

$$\sigma = \left(\frac{P_0}{T_0}\right)$$

using the third value $A_3$, the flight power W, and the conversion coefficient σ to calculate a fourth value $A_4$ such that:

$$A_4 = \left(\frac{W}{\sigma}\right)/A_3 = \left[\left(\frac{W'}{\sigma}\right)_{Vy}\right]$$

as a function of the fourth value $A_4$ which is such that:

$$A_4 = \left[\left(\frac{W'}{\sigma}\right)_{Vy}\right] = f_3\left(\frac{M_m}{\sigma}\right)$$

using a third performance curve for the aircraft applying the third function $f_3$ corresponding to the flight conditions of the aircraft, determining a fifth value $A_5$ such that:

$$A_5 = \left(\frac{M_m}{\sigma}\right);$$

and
using the fifth value $A_5$ to calculate the measured instantaneous mass $M_m$ such that:

$$M_m = A_5 \cdot \sigma$$

5. The method according to claim 1, wherein, when the aircraft is in level flight, the vertical speed Vz of the aircraft being substantially zero, the functional characteristics of the aircraft being defined by third and fourth series of performance curves applying a third formula:

$$\left(\frac{W'}{\sigma}\right)_{Vy} = f_3\left(\frac{M_m}{\sigma}\right)$$

and of a fourth formula:

$$\left(\frac{W}{\sigma}\right)/\left(\frac{W'}{\sigma}\right)_{Vy} = f_4\left[\left(\frac{Vh}{Vy}\right)^3, \frac{M_m}{\sigma}\right]$$

where W is the flight power of the aircraft (10), σ is a conversion coefficient, $M_m$ is the measured instantaneous mass of the aircraft, Vh is the horizontal speed of the aircraft, Vy is the best rate-of-climb speed of the aircraft, $f_3$ and $f_4$ are respectively third and fourth functions represented by two series of performance curves for the aircraft, a first ratio $$\left(\frac{W}{\sigma}\right)$$

is obtained for any horizontal speed Vh of the aircraft, the flight power W corresponding to the horizontal speed Vh, a second ratio $$\left(\frac{W'}{\sigma}\right)_{Vy}$$

is obtained for a speed Vh' of the aircraft that is horizontal only and equal to the best rate-of-climb speed Vy, and an optimum power W' corresponds to the horizontal speed Vh', the measured instantaneous mass $M_m$ is determined as being the mass that makes it possible to solve the third and fourth formulas simultaneously with the flight power W and the horizontal speed Vh.

6. The method according to claim 5, wherein the following steps are performed:

calculating a sixth value $A_6$ such that:

$$A_6 = \left(\frac{Vh}{Vy}\right)^3$$

as a function of the horizontal speed Vh of the aircraft and of the best rate-of-climb speed Vy of the aircraft;

as a function of the sixth value $A_6$ and using a series of fourth performance curves for the aircraft applying the fourth function $f_4$, determining first pairs of values formed by a third value $A_3$ and by a fifth value $A_5$ such that:

$$A_3 = \left(\frac{W}{\sigma}\right) \Big/ \left(\frac{W'}{\sigma}\right)_{V_y}$$

and $$A_5 = \frac{M_m}{\sigma};$$

calculating the conversion coefficient $\sigma$ such that:

$$\sigma = \left(\frac{P_0}{T_0}\right);$$

using each third value $A_3$, the flight power W, and the conversion coefficient $\sigma$ to calculate a fourth value $A_4$ such that:

$$A_4 = \left(\frac{W}{\sigma}\right) \Big/ A_3 = \left[\left(\frac{W'}{\sigma}\right)_{V_y}\right]$$

in order to form second pairs of values formed by a fourth value $A_4$ and by a fifth value $A_5$;

determining the second pair of values formed by a fourth value $A_4$ and by a fifth value $A_5$ that solves the third formula by means of a third performance curve for the aircraft applying the third function $f_3$ and corresponding to the flight conditions of the aircraft; and using the fifth value $A_5$ of the second pair of values that solves the third formula to calculate the measured instantaneous mass $M_m$ such that:

$M_m = A_5 \cdot \sigma$

7. The method according to claim 1, wherein the following steps are performed:

calculating a calculated instantaneous mass $M_c$, which is determined from variation in the quantity of fuel present in the aircraft; and comparing the measured instantaneous mass $M_m$ and the calculated instantaneous mass $M_c$ to obtain an estimated instantaneous mass M of the aircraft that is reliable and consolidated.

8. The method according to claim 7, wherein, to compare the values of the measured instantaneous mass $M_m$ and of the calculated instantaneous mass $M_c$ during a flight of the aircraft in arithmetical manner, the following steps are performed:

determining a first discrepancy between the measured instantaneous mass $M_m$ and the calculated instantaneous mass $M_c$;

if the discrepancy is less than or equal to an error threshold, considering the measured instantaneous mass $M_m$ as being an estimated instantaneous mass M that is reliable and usable; and if the first discrepancy is greater than the error threshold, considering the measured instantaneous mass $M_m$ to be an estimated instantaneous mass M that is not usable and issuing an alert.

9. The method according to claim 7, wherein the values of the measured instantaneous mass $M_m$ and of the calculated instantaneous mass $M_c$ are compared during a flight of the aircraft in statistical manner.

10. A method of estimating the instantaneous mass of a rotary wing aircraft, the aircraft having a power plant with at least one engine and a main power transmission gearbox, the main gearbox driving at least a main rotor and an anti-torque rotor in rotation, the method comprising the following steps during a flight of the aircraft:

measuring flight characteristics of the aircraft;

measuring power characteristics of the aircraft;

measuring atmospheric characteristics of the environment of the aircraft;

determining a flight power W of the aircraft based at least in part on the power characteristics of the aircraft;

determining an operating point of the aircraft on at least one series of performance curves for the aircraft as a function of the flight characteristics of the aircraft, of the atmospheric characteristics of the environment of the aircraft, and of the flight power W of the aircraft;

deducing from the determined operating point of the aircraft on the at least one series of performance curves for the aircraft a measured instantaneous mass $M_m$ of the aircraft;

calculating a calculated instantaneous mass $M_c$, which is determined from variation in the quantity of fuel present in the aircraft;

comparing the measured instantaneous mass $M_m$ and the calculated instantaneous mass $M_c$ to obtain an estimated instantaneous mass M of the aircraft that is reliable and consolidated, wherein the values of the measured instantaneous mass $M_m$ and of the calculated instantaneous mass $M_c$ are compared during the flight of the aircraft in statistical manner;

determining a first discrepancy between the measured instantaneous mass $M_m$ and the calculated instantaneous mass $M_c$;

calculating a first mean of the determined first discrepancies between an instant t and initial instant $t_0$;

if the first mean is less than or equal to an error threshold, considering the measured instantaneous mass $M_m$ as being an estimated instantaneous mass M that is reliable and usable; and if the first mean is greater than the error threshold, considering the measured instantaneous mass $M_m$ as being an estimated instantaneous mass M that is not usable and issuing an alert.

11. The method according to claim 9, wherein the following steps are performed:

determining a first discrepancy between the measured instantaneous mass $M_m$ and the calculated instantaneous mass $M_c$;

calculating a first mean of the first discrepancies determined between an instant t and an initial instant $t_0$, and calculating an associated first standard deviation; and analyzing the first mean and the first associated standard deviation to determine whether the measured instantaneous mass $M_m$ should be considered as being an estimated instantaneous mass M that is reliable and usable.

12. The method according to claim 9, wherein the values of the measured instantaneous mass $M_m$ and of the calculated instantaneous mass $M_c$ are compared during a flight of the aircraft by means of at least one Kalman filter.

13. The method according to claim 1, wherein the following steps are performed:

measuring an instantaneous volume flow rate $Dv_i$ of fuel consumption feeding the power plant;

measuring the instantaneous temperature $T_i$ of the fuel;

calculating an instantaneous mass flow rate $Dm_i$ of the fuel;

determining a mass $M_{CC}$ of the fuel that has been consumed since an initial instant $t_0$ by integrating the instantaneous mass flow rate $Dm_i$ of the fuel since the initial instant $t_0$;

calculating a calculated instantaneous mass $M_c$, which is equal to the total initial mass $M_0$ of the aircraft at the initial instant $t_0$ with the mass $M_{CC}$ of fuel that has been consumed subtracted therefrom; and comparing the measured instantaneous mass $M_m$ and the calculated instantaneous mass $M_c$ to obtain an estimated instantaneous mass $M$ of the aircraft that is reliable and consolidated.

14. The method according to claim 1, wherein the aircraft includes at least one tank in which the fuel is stored, and the following steps are performed:

measuring a volume $V_{CR}$ of the fuel that remains in all of the tanks taken together;

measuring the instantaneous temperature $T_i$ of the fuel;

calculating a mass $M_{CR}$ for the fuel remaining in all of the tanks taken together;

determining a mass $M_{CC}$ of fuel that has been consumed since an initial instant $t_0$ by subtracting the mass $M_{CRt}$ of the fuel remaining at the instant $t$ from the mass $M_{CRt0}$ of the fuel remaining in the tanks at the initial instant $t_0$;

calculating a calculated instantaneous mass $M_c$ which is equal to the total initial mass $M_0$ of the aircraft at the initial instant $t_0$ minus the mass $M_{CC}$ of fuel that has been consumed; and comparing the measured instantaneous mass $M_m$ and the calculated instantaneous mass $M_c$ to obtain an estimated instantaneous mass $M$ of the aircraft that is reliable and consolidated.

15. The method according to claim 1, wherein the aircraft has at least one tank in which the fuel is stored, and the following steps are performed:

measuring a volume $V_{CR}$ of the fuel remaining in all of the tanks;

measuring the instantaneous temperature $T_i$ of the fuel;

calculating a mass $M_{CR}$ of the fuel remaining in the tanks;

calculating a calculated instantaneous mass $M_c$, which is equal to the initial mass $M_1$ of the aircraft at the initial instant $t_0$ not including fuel plus the mass $M_{CR}$ of the remaining fuel; and comparing the measured instantaneous mass $M_m$ and the calculated instantaneous mass $M_c$ to obtain an estimated instantaneous mass $M$ of the aircraft that is reliable and consolidated.

16. The method according to claim 13, wherein, to compare the values of the measured instantaneous mass $M_m$ and of the calculated instantaneous mass $M_c$ during a flight of the aircraft in statistical manner by means of a Kalman filter, the following steps are performed:

determining a measurement vector $Z_m$ such that:

$$Z_m \begin{pmatrix} M_m \\ M_{CC} \end{pmatrix},$$

where $M_m$ is the measured instantaneous mass and $M_{CC}$ is the mass of fuel that has been consumed by the aircraft;

defining a state vector $X$ that is to be determined such that:

$$X \begin{pmatrix} M \\ M_0 \end{pmatrix},$$

where $M$ is an estimated instantaneous mass and $M_0$ is the total initial mass of the aircraft;

defining a state equation:

$$\dot{X} = A \cdot X + B \cdot Dm_i$$

with:

$$A = \begin{bmatrix} 0 & 0 \\ 0 & 0 \end{bmatrix} \text{ and } B = \begin{bmatrix} -1 \\ 0 \end{bmatrix}$$

$Dm_i$ being the instantaneous mass flow rate of the fuel equal to the derivative of the mass of fuel $M_{CC}$ that has been consumed by the aircraft, $\dot{X}$ being the derivative of the state vector $X$;

defining a measurement equation:

$$Z_m = C \cdot x$$

with:

$$C = \begin{bmatrix} 1 & 0 \\ -1 & 1 \end{bmatrix};$$

and applying the state equation and the measurement equation to a Kalman filter to determine the state vector $X$, and consequently determining the estimated instantaneous mass $M$ and the total initial mass $M_0$ of the aircraft.

17. The method according to claim 10, wherein the flight power $W$ is equal to the sum of the power consumed by the main rotor plus the power consumed by the anti-torque rotor.

18. A device for estimating the instantaneous mass of a rotary wing aircraft, the aircraft having a power plant with at least one engine and a main power transmission gearbox, together with a plurality of sensors providing measurements about flight characteristics of the aircraft, power characteristics of the aircraft, and atmospheric characteristics of the environment of the aircraft, the main gearbox driving at least a main rotor and an anti-torque rotor in rotation, the device for estimating the instantaneous mass comprising:

at least one calculation means having at least one Kalman filter;

at least one memory storing series of performance curves for the aircraft;

the at least one calculation means configured to:

receive the measurements from the sensors during a flight of the aircraft;

determine a flight power $W$ of the aircraft based at least in part on the power characteristics of the aircraft;

determine an operating point of the aircraft on at least one series of performance curves for the aircraft as a function of the flight characteristics of the aircraft, of the atmospheric characteristics of the environment of the aircraft, and of the flight power $W$ of the aircraft;

deduce from the determined operating point of the aircraft on the at least one series of performance curves for the aircraft a measured instantaneous mass $M_m$ of the aircraft; and compare, using the at least one Kalman filter, variation of the measured instantaneous mass $M_m$ and a calculated instantaneous mass $M_c$ during the flight of the aircraft to determine an estimated instantaneous mass $M$ of the aircraft.

19. The method according to claim 1, wherein:
the flight characteristics of the aircraft is one or more of the horizontal speed Vh of the aircraft, the vertical speed Vz of the aircraft, and the height Hz of the aircraft relative to the ground;
the power characteristics of the aircraft is one or more of the torque $C_R$ and the real speed of rotation NR of the main rotor and the torque $C_{RAC}$ and the real speed of rotation $NR_{AA}$ of the anti-torque rotor; and
the atmospheric characteristics of the environment of the aircraft is one or more of the atmospheric pressure $P_0$ and the temperature $T_0$ of the air around the aircraft.

* * * * *